United States Patent [19]

Tachikawa et al.

[11] Patent Number: 5,092,568
[45] Date of Patent: Mar. 3, 1992

[54] COIL SPRING DEVICE

[75] Inventors: Toshihiro Tachikawa; Toshio Hamano, both of Yokohama, Japan

[73] Assignee: NHK Spring Co., Ltd., Yokohama, Japan

[21] Appl. No.: 495,833

[22] Filed: Mar. 19, 1990

[30] Foreign Application Priority Data

Mar. 31, 1989 [JP] Japan .................. 1-83668

[51] Int. Cl.$^5$ .................................................. F16F 1/12
[52] U.S. Cl. .................................. 267/179; 267/170; 267/286; 280/724; 403/157
[58] Field of Search .................. 262/4, 170, 171, 172, 262/179, 166, 221, 248, 286; 280/724; 403/157

[56] References Cited

U.S. PATENT DOCUMENTS

| | | | |
|---|---|---|---|
| 910,009 | 1/1909 | Meredith | 267/179 X |
| 930,677 | 8/1909 | Mesinger | 267/286 |
| 1,061,420 | 5/1913 | Sanvold et al. | 267/179 X |
| 1,295,316 | 2/1919 | Hines | 267/179 X |
| 1,851,973 | 4/1932 | Brandt | 267/179 X |
| 3,649,000 | 3/1972 | Desy | |
| 4,093,198 | 6/1978 | Petersen | |
| 4,763,882 | 8/1988 | Nishiyama et al. | |
| 4,778,162 | 10/1988 | Borlinghaus | 267/248 |

FOREIGN PATENT DOCUMENTS

| | | | |
|---|---|---|---|
| 3641549 | 6/1988 | Fed. Rep. of Germany | 267/170 |
| 53-9975 | 1/1978 | Japan | 267/170 |
| 56-60707 | 5/1981 | Japan . | |
| 59-43324 | 10/1984 | Japan . | |
| 60-85003 | 5/1985 | Japan . | |

Primary Examiner—George E. A. Halvosa
Attorney, Agent, or Firm—Frishauf, Holtz, Goodman & Woodward

[57] ABSTRACT

A coil spring device comprises a coil spring formed of a spiral wire having a first end and a second end, a first end support mechanism supporting the first end of the wire, and a second end support mechanism supporting the second end of the wire. The paired support mechanisms are movable relatively to each other in the axial direction of the coil spring. The first support mechanism supports the first end of the wire for rotation only around a first diametrical axis which extends toward a coil central axis. The second support mechanism supports the second end of the wire for rotation only around a second diametrical axis which extends toward the central axis.

5 Claims, 11 Drawing Sheets

PRIOR ART

COIL SPRING DEVICE

BACKGROUND OF THE INVENTION

1. Field of the Invention

The present invention relates to a coil spring device adapted for use in a car suspension system having at least two axes or as shock absorbing means for various apparatus.

2. Description of the Related Art

Figure 20:
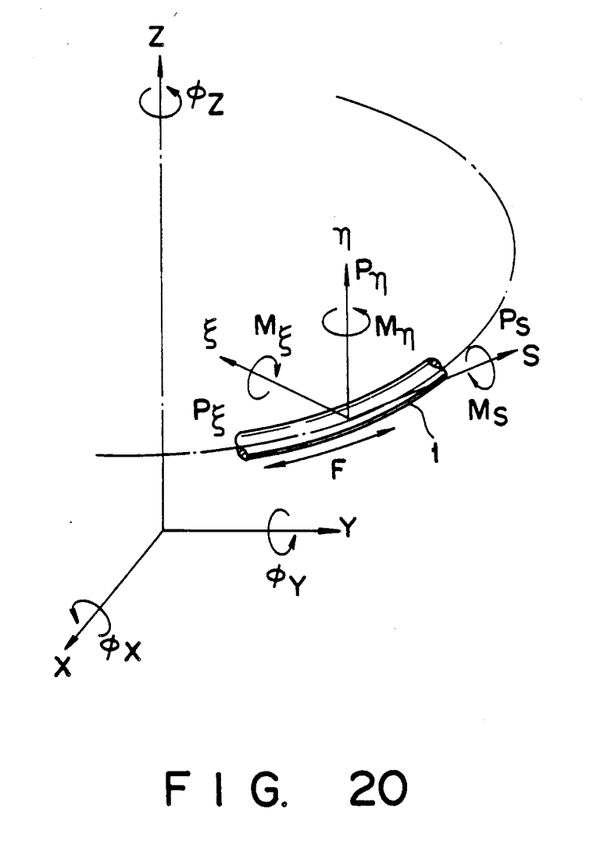
FIG. 20 is a diagram showing part of a wire of a coil spring and the directions of stresses produced in the wire.

Coil springs, such as compression springs and tension springs, are used in various applications. If a load is applied to a conventional coil spring, the degree of freedom of the spring may be supposed to be based on six factors, including linear displacements along the X-, Y-, and Z-axes and rotational displacements $\Psi_X$, $\Psi_Y$ and $\Psi_Z$ around the X-, Y-, and Z-axes, as shown in FIG. 20. Axial force Ps along axis S of wire 1, torsional moment $M_S$, shearing force $P\eta$, bending moment $M\eta$, etc. are produced in various parts of wire 1 of the spring. Accordingly, stresses produced by the combination of these forces are not uniformly distributed on the surface of wire 1, with respect to the direction of arrow F of FIG. 20 along the wire.

Figure 21:
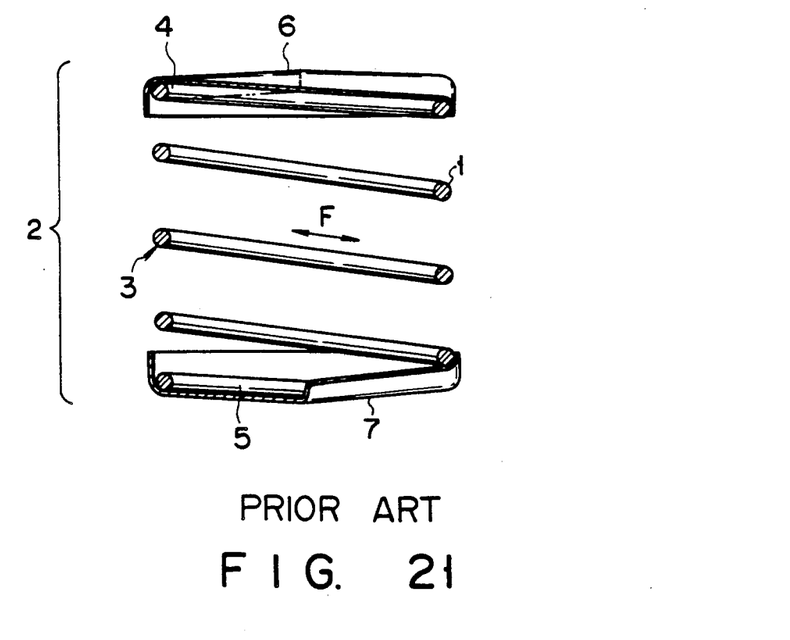
FIG. 21 is a sectional view of a prior art coil spring device.
Figure 22:
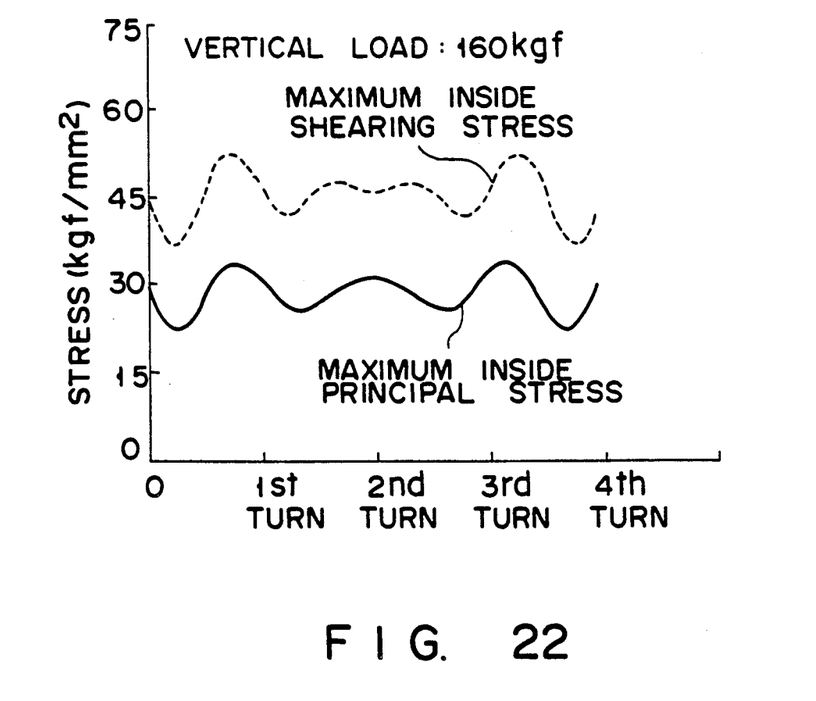

In prior art coil spring device 2 shown in FIG. 21, for example, end turns 4 and 5 of coil spring 3 are bound by means of spring seats 6 and 7 so that a vertical load is applied to spring 3 via seats 6 and 7. If upper spring seat 6 is pressed toward lower spring seat 7, for example, coil spring 3 is brought to the so-called parallel compressed state. Since end turns 4 and 5 are fixed and prevented from rotating by spring seats 6 and 7, moreover, spring 3 is allowed only to move in the direction of the Z-axis of FIG. 20. An examination of the stress in the direction along wire 1 of coil spring 3 in the parallel compressed state revealed a wavy stress distribution, as shown in FIG. 22. By way of example, conventional coil spring 3 may enjoy the wire diameter of 9.5 mm, number of turns of 4.0, pitch diameter of 80 mm, free height of 320 mm, and applied load of 160 kgf. FIG. 22 shows the maximum inside principal stress and the maximum inside shearing stress. It is known that the maximum outside principal stress and the maximum outside shearing stress behave in like manner.

If the waviness of the stress distribution so remarkable, as in the case of conventional coil spring device 2, an extremely high stress is locally applied to some regions of the surface of wire 1. If these surface regions have any surface defects, such as scratches, the wire is liable to be broken.

Published Unexamined Japanese Patent Publication No 60-85003 (Prior Art Example 1) is proposed as a conventional example of an improvement of an end support structure for a coil spring wire. In this example, one end of the spring wire is supported by means of a support element, such as a steel sphere, for rotation in all directions, whereby a bending stress produced at the wire end is reduced. In a suspension spring disclosed in Published Unexamined Japanese Patent Publication No. 56-60707 (Prior Art Example 2), moreover, spring seats for retaining a coil spring are each rockably supported by means of a pin or a steel sphere, whereby a bending moment on the spring is canceled. In Prior Art Examples 1 and 2, the stress distribution in the direction along wire 1 is not taken into consideration at all.

If the wire end is supported for rotation in all directions, as in Prior Art Example 1, the construction of wire end support means is complicated, and the support is liable to be unstable. In Example 1, although the spring can support a load in the direction of compression, the wire end cannot be bound for a load in the tensile direction.

In Prior Art Example 2, on the other hand, the spring requires end turns and spring seats. When the wire is compressed, therefore, the end turns and the seats are brought into contact with one another, thereby causing tappings, which entail noises. Since the spring seats and the end turns are heavy in weight, the whole coil spring device is inevitably heavy.

SUMMARY OF THE INVENTION

Accordingly, the object of the present invention is to provide a coil spring device capable of substantially evening stresses on the surface of a spring, distributed along a wire, despite the use of end support mechanisms with a simple construction.

According to a coil spring device of the present invention, the stress distribution along the wire can be evened so that the spring cannot be easily broken, and spring ends can be supported with stability. Since end turns and spring seats are unnecessary or simple in construction, moreover, the device can be reduced in weight, and tappings can be reduced or removed. Also, end support means for the coil spring can be made compact.

The inventors hereof examined the stress distribution along the wire obtained when a load was applied to the coil spring. Thereupon, it was unexpectedly found that stresses in the direction along the wire can be substantially evened by only supporting the wire ends for rotation only in one direction. Thus, the eccentricity of applied load can be made very scanty by only freeing the rotation of the coil ends around axes extending toward the coil central axis, without freeing all of rotational displacements $\Psi_X$, $\Psi_Y$ and $\Psi_Z$ mentioned before.

A coil spring device of the present invention, which has been developed to achieve the above object, in consideration of these circumstances, comprises a coil spring formed of a spiral wire having first and second ends, and a pair of end support mechanisms individually supporting the first and second ends of the wire. Two opposite ends of the coil spring, that is, the first and second ends of the wire, are supported by means of their corresponding end support mechanisms so as to be rotatable around their corresponding diametrical axes which extend toward a coil central axis. The paired support mechanisms are movable in a direction such that they can approach or recede from each other. If a load in the direction of the coil axis is applied to the coil spring via the end support mechanisms, the spring deflects so that the first and second ends of the wire rotate around the diametrical axes, thereby evening the stress distribution along the wire.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description give above and the detailed description of the preferred embodiments given below, serve to explain the principles of the invention.

FIG. a 22 is a diagram showing stress distributions of a wire of the prior art device shown in FIG. 21.

DETAILED DESCRIPTION OF THE PREFERRED EMBODIMENTS

A first embodiment of the present invention will now be described with reference to the accompanying drawings of 1 to 10.

Figures 1, 2:
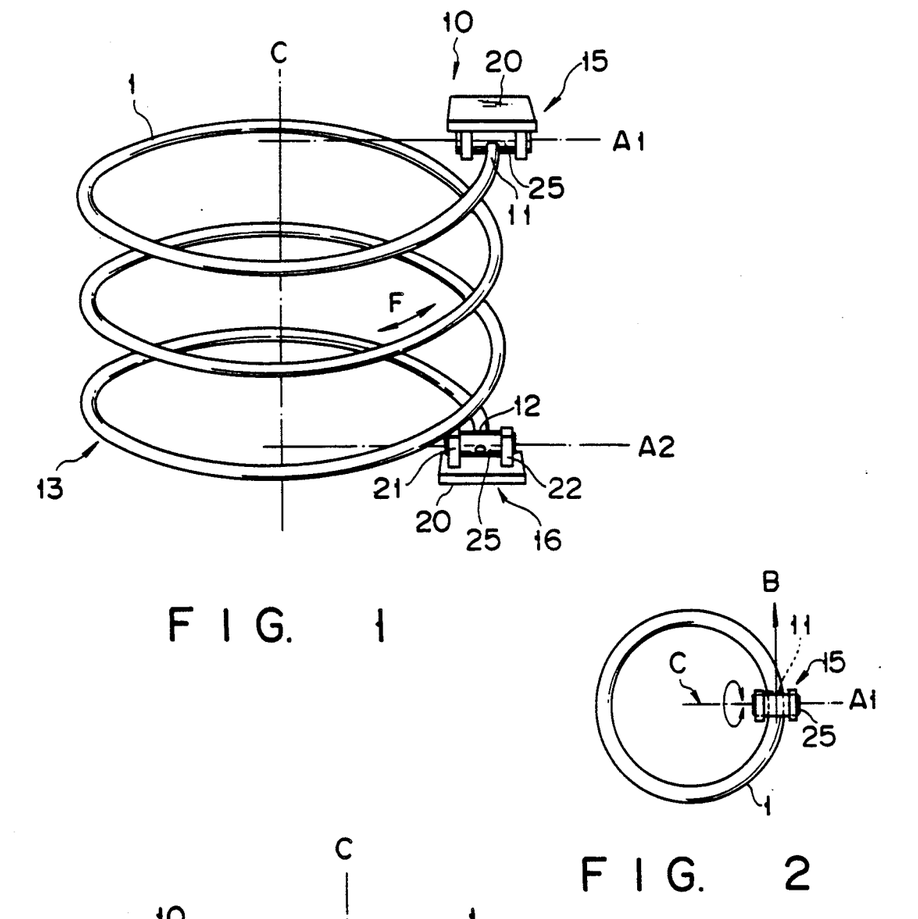
FIG. 1 is a perspective view of a coil spring device according to a first embodiment of the present invention.
FIG. 2 is a plan view of the coil spring device shown in FIG. 1.

Coil spring device 10 shown in FIG. 1 comprises coil spring 13 formed of spiral wire 1 having first and second ends 11 and 12, and end support mechanisms 15 and 16 for supporting first and second ends 11 and 12, respectively. Although coil spring 13 of the present embodiment, like a conventional coil spring, is formed of spring steel, it may alternatively be formed of ceramics or any other materials than spring steel. Wire 1 may be either solid or hollow. By way of example, spring 13 may be a uniform-pitch cylindrical coil spring having the wire diameter of 9.5 mm, number of turns of 4.0, pitch diameter of 80 mm, and free height of 320 mm. First and second ends 11 and 12 of wire 1 extend in the direction of arrow B of FIG. 2, which is tangent to the circumference of coil spring 13.

Figure 3:
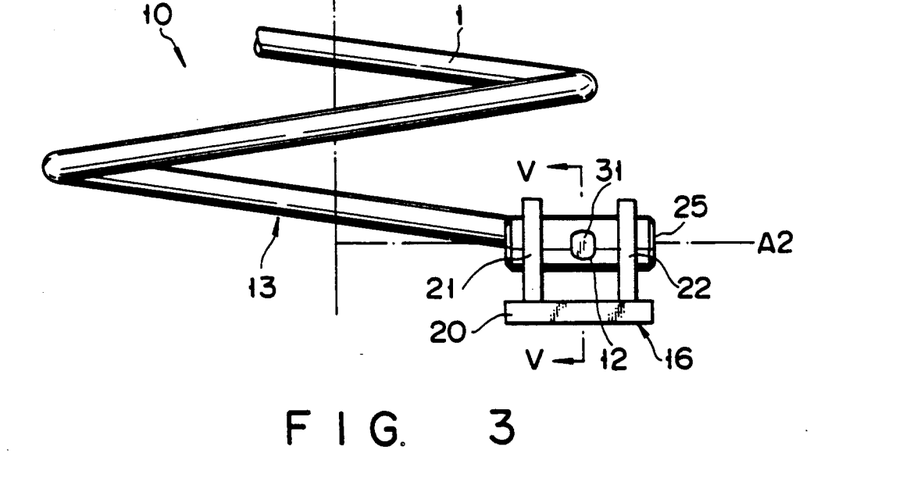
FIG. 3 is a front view showing an end portion o the coil spring device shown in FIG. 1.
Figure 4:
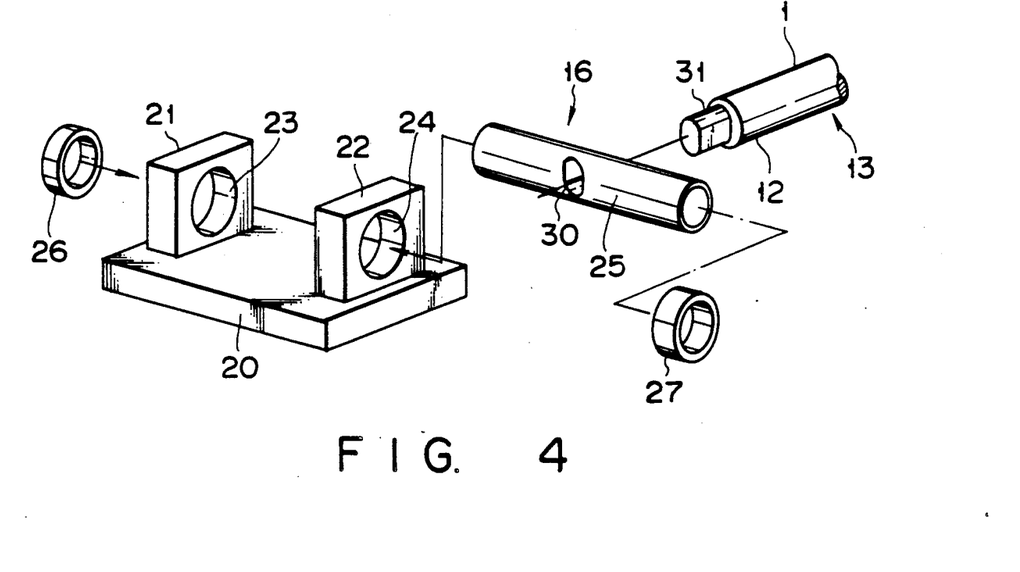
FIG. 4 is an exploded perspective view of an end support mechanism of the coil spring device shown in FIG. 1.

Since end support mechanisms 15 and 16 have the same construction, only mechanism 16 shown in FIGS. 3 to 5 will be described representatively. A pair of support members 21 and 22 are arranged on base 20 of support mechanism 16, and shaft member 25 is inserted in holes 23 and 24 bored through members 21 and 22, respectively. Shaft member 25 is supported by support members 21 and 22 so as to be rotatable around diametrical axis A2 which extends toward central axis C (corresponding to the Z-axis of FIG. 20) of coil spring 13. In order to make the rotation of shaft member 25 smooth, collars 26 hole 23 and 24 of member 25 and support members 21 and 22, respectively.

Through hole 30 is bored through the center of shaft member 25 with respect to the axial direction thereof. Constricted end portion 31 of coil spring 13 is fitted in hole 30 so that end portion 31 is restrained from rotating around the axis of end 12 of wire 1. In other words, member 25 is fixed to end 12 of wire 1. Two support mechanisms 15 and 16 are movable relatively to each other in the axial direction of spring 13 so that they can approach or recede from each other.

Figures 5, 6:
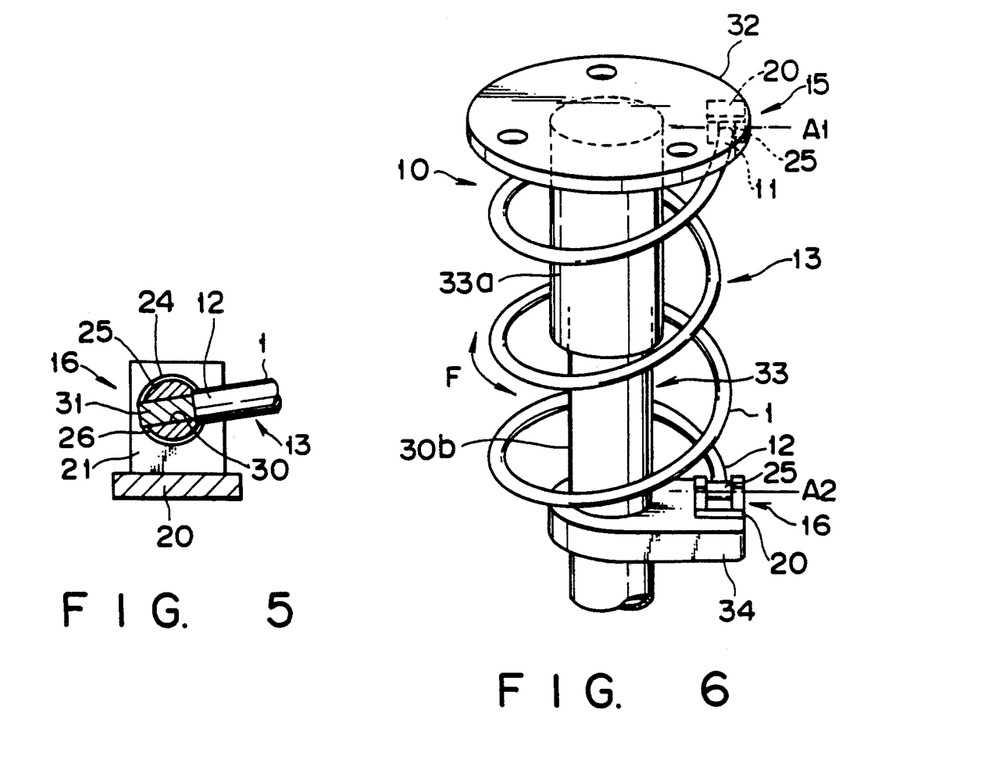
FIG. 5 is a sectional view taken along line V—V of FIG. 3.
FIG. 6 is a perspective view of a suspension system using the coil spring device shown in FIG. 1.
Figure 6A:
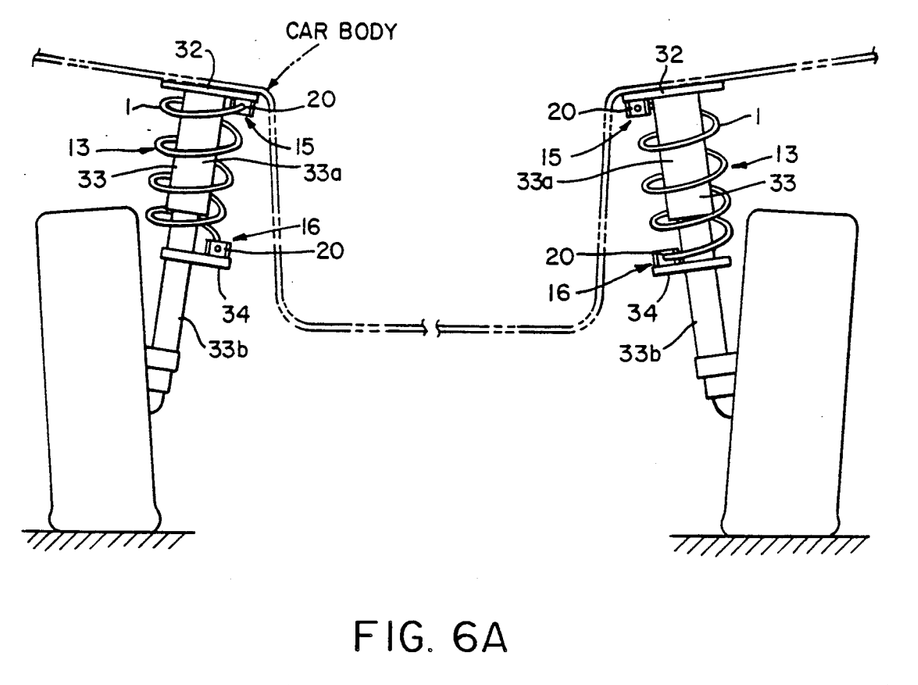
FIG. 6A shown two coil spring device shown in FIG. 6 on opposite sides of a vehicle.
Figure 7:
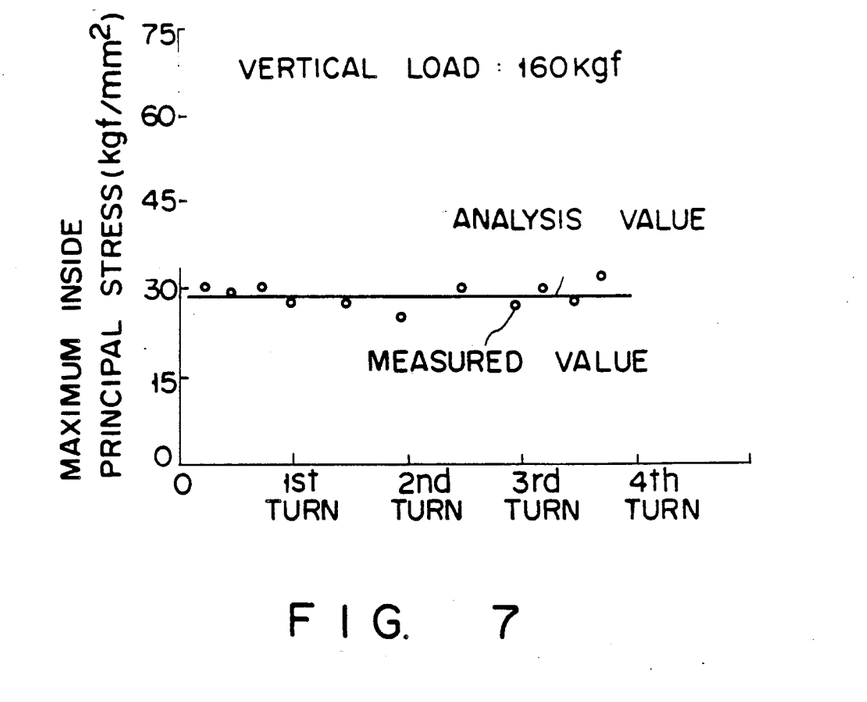
FIGS. 7 to 10 are diagrams individually showing stress distributions of a wire of the coil spring device shown in FIG. 1.
Figure 8:
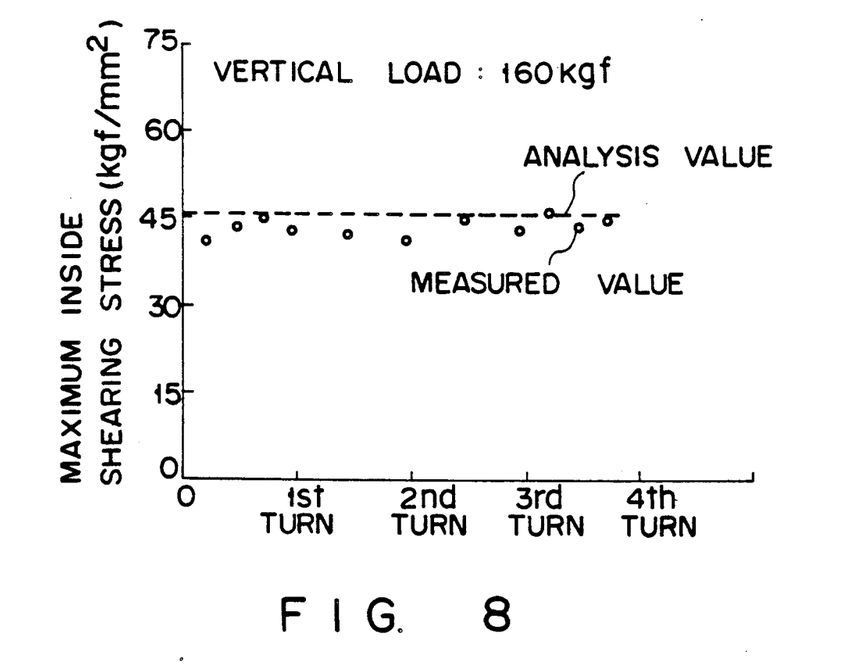
Figure 9:
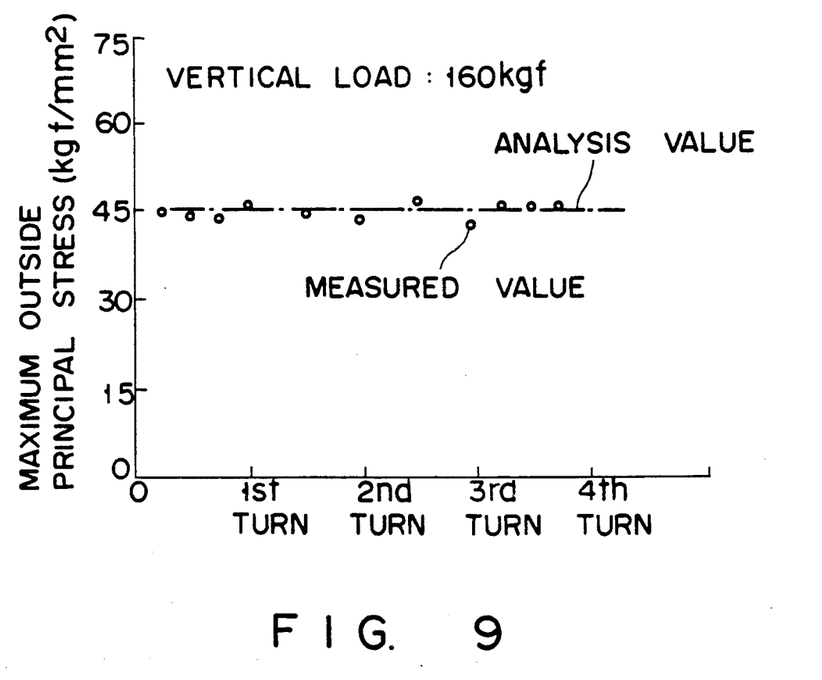
Figure 10:
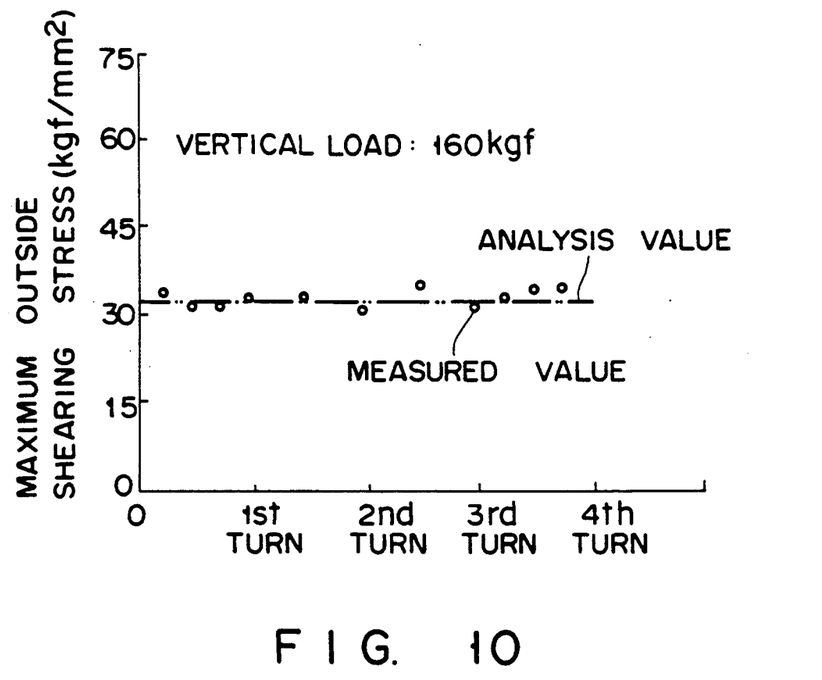
Figures 11, 12:
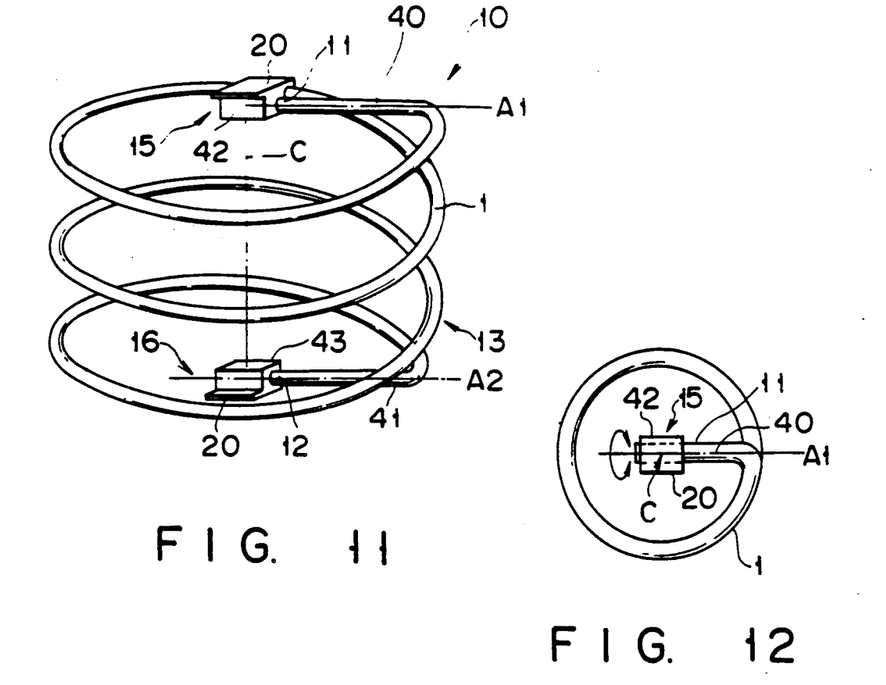
FIG. 11 is a perspective view of a coil spring device according to a second embodiment of the present invention.
FIG. 12 is a plan view of the coil spring device shown in FIG. 11.
Figure 13:
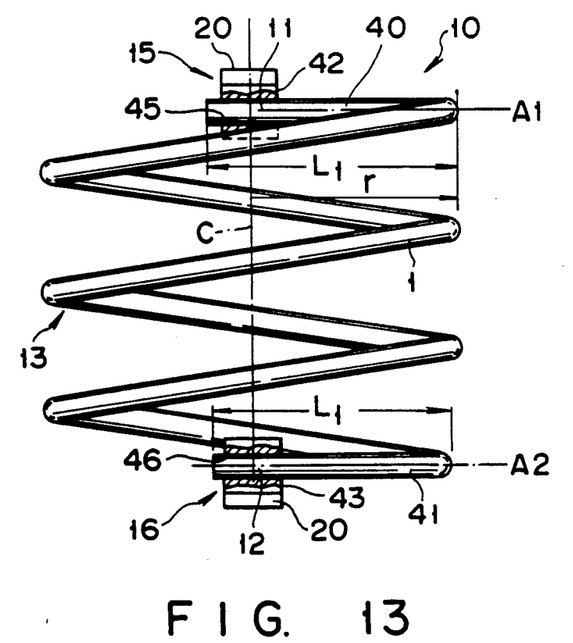
FIG. 13 a side view, partially in section, showing the coil spring device shown in FIG. 11.
Figure 14:
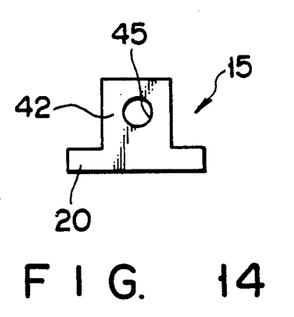
FIG. 14 is a front view of a support member of the coil spring device shown in FIG. 11.

If the coil spring device is used in a car suspension system, for example, as shown in FIGS. 6 and 6A, base 20 of upper support mechanism 15 is fixed to car-body-side member 32, while base of lower support mechanism 16 is fixed to seat 34 which is mounted on shock absorber 33, as shown in FIG. 6. Absorber 33 includes first member 33a fixed on the car body side, and second member 30b capable of reciprocating relatively to first member 33a in the axial direction. The lower end of second member 33b is connected to a hub carrier (see FIG. 6A), as an example of an axle-side member, or a lower arm (not shown). Base 20 of lower support mechanism 16 may alternatively be mounted on the hub carrier or the lower arm.

If a vertical load (FIG. 6) is applied to coil spring 13 via end support mechanisms 15 and 16, spring 13 is brought to the so-called parallel compressed state. When spring 13 deflects, shaft member 25 fixed to first end 11 rotates around first diametrical axis A1, while shaft member 25 fixed to second end 12 rotates around second diametrical axis A2. FIGS. 7 to 10 show results of actual measurement on the stress distribution in the direction of arrow F along wire 1 of coil spring 13. The load applied in this case is 160 kgf. FIGS. 7, 8, 9, and 10 show the maximum inside principal stress, maximum inside shearing stress, maximum outside principal stress, and maximum outside shearing stress, respectively.

As seen from these measured values, the stress distribution in the direction along wire 1 of coil spring device 10 is even. The maximum stress is about 15% lower than that of the conventional device (FIG. 21). Accordingly, device 10 of the present embodiment can be less easily broken than the conventional one. As for the fatigue life, it is more than twice that of the conventional device. More specifically, while the conventional device is broken after undergoing repeated stress cycles of $7 \times 10^4$, device 10 of the present embodiment, having the stress amplitude reduced by e.g. about 10 kgf, is broken only after undergoing stress cycles of $1.8 \times 10^5$.

Since the device of the present embodiment, unlike the conventional one, requires no end turns or bulky spring seats, a straight load-flexure characteristic (linear spring characteristic) can be obtained as a compressive load is applied. If the number of turns is fixed, the spring constant of the device of this embodiment is a little smaller. In other words, the number of turns can be reduced for the same spring constant, that is, the device can be reduced in weight. Coil spring 13 of the present embodiment, which requires no end turns, may be about 27% lighter in weight than the conventional spring. If the spring constant is fixed, the weight can be further reduced by about 4%. Since compact support mechanisms 15 and 16 are used in place of the bulky spring seats, moreover, the weight can be further reduced, and the mounting space for the spring can be secured with ease. Furthermore, tappings cannot be caused by contact between the end turns and the spring seats.

Figure 15:
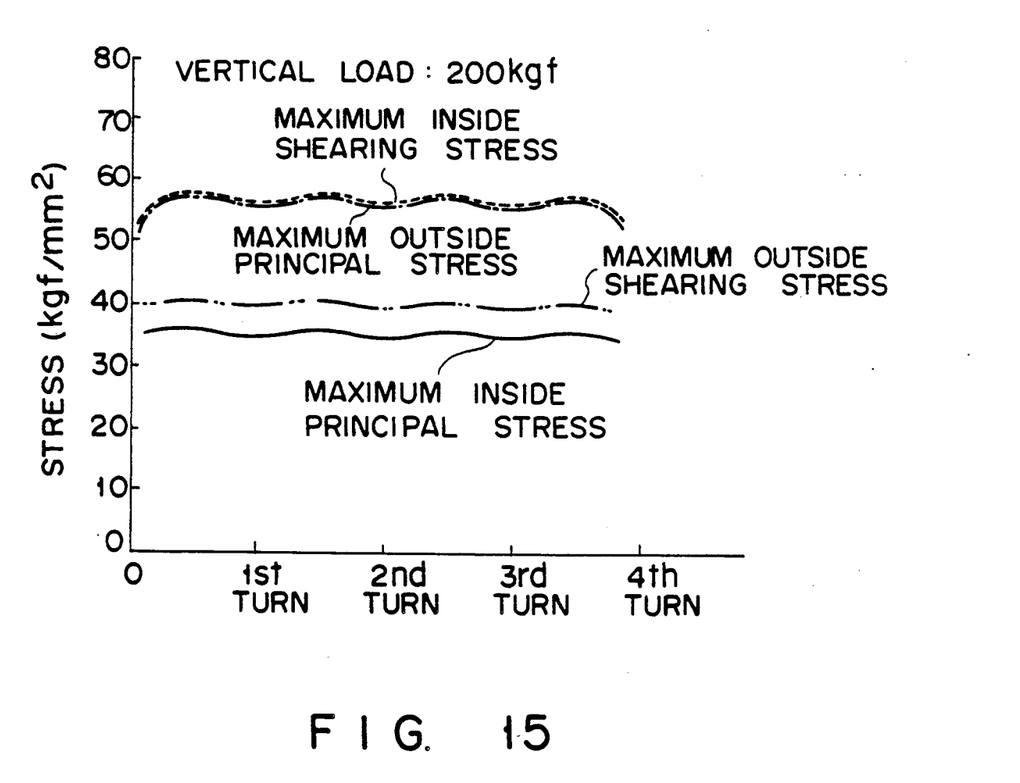
FIG. 15 is a diagram showing stress distributions of a wire of the coil spring device shown in FIG. 11.

FIGS. 11 to 14 show a second embodiment of the present invention. In this second embodiment, wire 1 of coil spring 13 has inward arm portions 40 and 41 in its regions including first and second ends 11 and 12, respectively. Arm portions 40 and 41 linearly extend for length L1 toward coil central axis C. Length L1 is a little longer than the radius of spring 13. Ends 11 and 12 of wire 1 are supported by support mechanisms 15 and 16 having support members 42 and 43, respectively. Support members 42 and 43 of this embodiment have holes 45 and 46, respectively, through which ends 11 and 12 of wire 1 are inserted so as to be rotatable around the axes of ends 11 and 12, that is, diametrical axes A1 and A2 extending toward central axis C. Both support members 42 and 43 are situated close to central axis C. When coil spring 13 deflects as members 42 and 43 move in the direction to approach each other, ends 11 and 12 of wire 1 rotate around the axis of wire 1, that is, diametrical axes A1 and A2, respectively. FIG. 15 shows stress distributions of this embodiment. Also in this second embodiment, the stress distributions can be made even enough, as compared with the conventional case.

Figure 16:
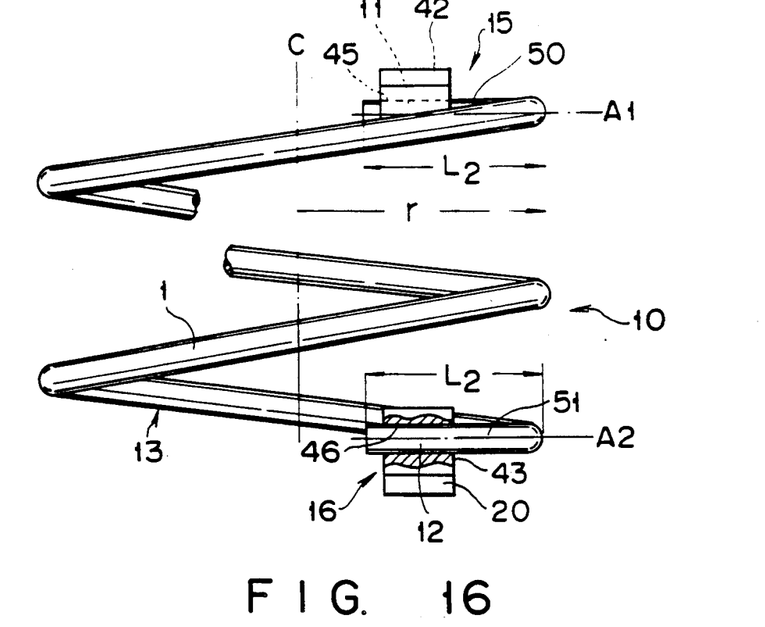
FIG. 16 is a side view, partially in section, showing part of a coil spring device according to a third embodiment of the present invention.
Figure 17:
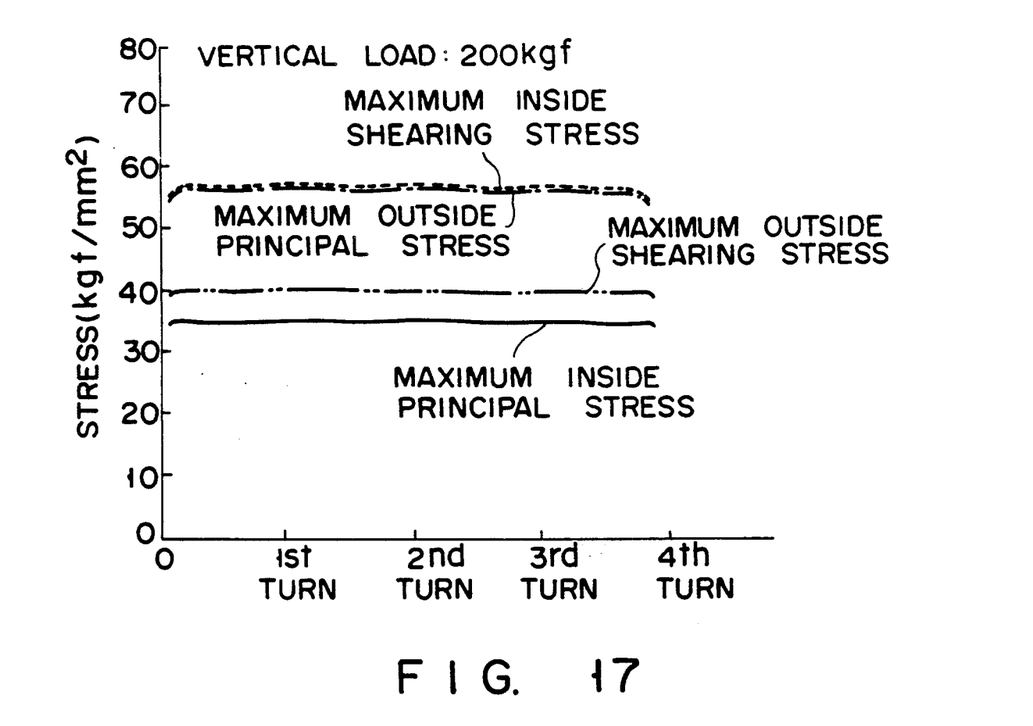
FIG. 17 is a diagram showing stress distributions of a wire of the coil spring device shown in FIG. 16.

FIG. 16 shows a third embodiment of the present invention. In this third embodiment, wire 1 has inward arm portions 50 and 51 of length L2 in its regions including first and second ends 11 and 12, respectively. Length L2 is shorter than length L1 of inward arm portions 40 and 41 of the second embodiment. Thus, L2 is shorter than the radius of coil spring 13. For the other fundamental arrangements, the third embodiment is designed in the same manner as the second embodiment. FIG. 17 shows stress distributions along wire 1 obtained when a load is applied to coil spring 13 of the third embodiment.

Figure 18:
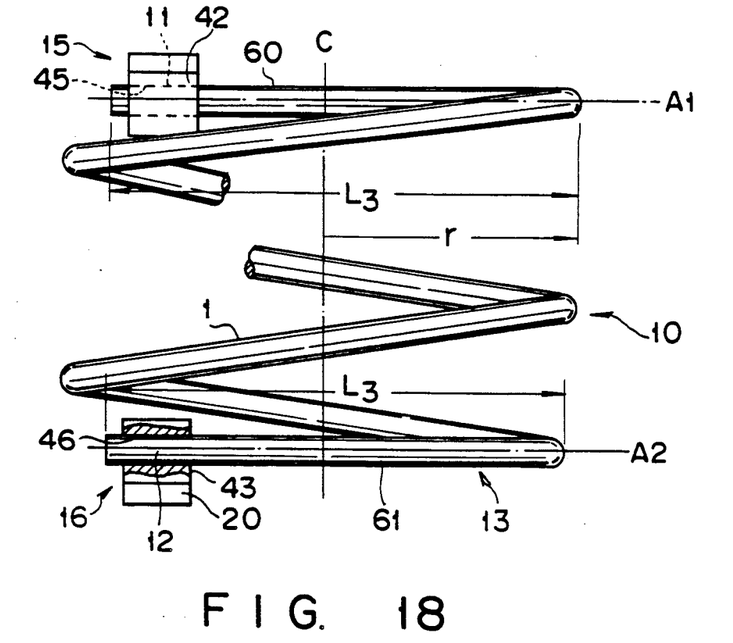
FIG. 18 is a side view, partially in section, showing part of a coil spring device according to a fourth embodiment of the present invention.
Figure 19:
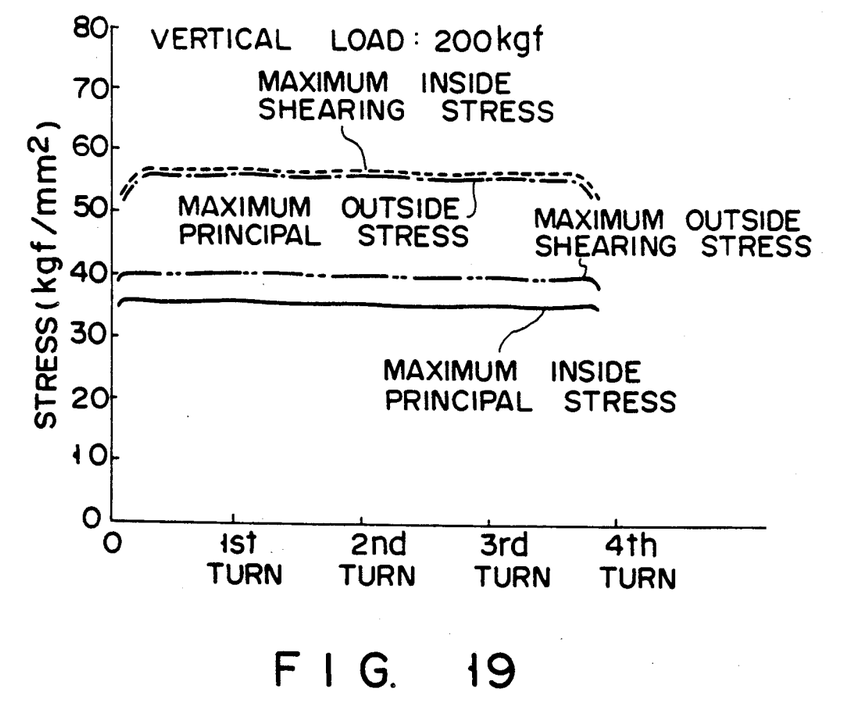
FIG. 19 is a diagram showing stress distributions of a wire of the coil spring device shown in FIG. 18.

FIG. 18 shows a fourth embodiment of the present invention. Length L3 of inward arm portions 60 and 61 of wire 1 of this fourth embodiment is longer than length L1 of inward arm portions of the second embodiment. Arm portions 60 and 61 linearly extend from the circumference of coil spring 13 toward coil central axis C. Length L3 is longer than the radius of spring 13. For the other fundamental arrangements and functions, the fourth embodiment is designed in the same manner as the second embodiment. FIG. 19 shows stress distributions along wire 1 obtained when a load is applied to coil spring 13 of the fourth embodiment.

One of ends 11 and 12 of coil spring 13 according to each of the second to fourth embodiments may be supported by means of end support mechanisms 15 and 16 described in connection with the first embodiment. In the embodiments described above, the extending directions of diametrical axes A1 and A2 may be somewhat deviated from coil central axis C without departing from the scope or spirit of the invention.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A coil spring device which distributes an applied load substantially uniformly, comprising:
   a compression coil spring formed of a spirally wound wire, said coil spring having a first end, a second end, a longitudinal central axis and a circumference, both said first and second ends of said coil spring extending in a direction tangent to said circumference of said coil spring;
   a first end support mechanism for supporting said first end of said coil spring, said first end support mechanism including a first shaft member, extending perpendicular to said first end of said coil spring, and a first pair of support member supporting said first shaft member for rotation around a first diametrical axis which extends toward said coil spring longitudinal central axis; and said first shaft member having an aperture for receiving and fixedly holding said first end of said coil spring therein; and
   a second end support mechanism for supporting said second end of said coil spring, said second end support mechanism being movable relative to said first end support mechanism, in the direction of the longitudinal central axis of said coil spring, and including a second shaft member, extending perpendicular to said second end of said coil spring, and a second pair of support members supporting said second shaft member for rotation around a second diametrical axis which extends toward said coil spring longitudinal central axis, said second shaft member having an aperture therein for receiving and fixedly holding said second end of said coil spring therein.

2. A coil spring device according to claim 1, for use in a suspension system for a vehicle having a body and at least one axle, further comprising:
   first mounting means for mounting said first end support mechanism to said body of said vehicle; and
   second mounting means for mounting said second end support mechanism to said at least one axle.

3. A coil spring device according to claim 2 in which said vehicle has at least two axles, and wherein:
   at least one said coil spring device is mounted between said body of said vehicle and each of said at least two axles.

4. A coil spring device according to claim 3 wherein the body of the vehicle is movable relative to both of said t least two axles.

5. A coil spring device according to claim 1 for use in a shock absorbing system, said coil spring device being positioned between first and second bodies which are movable relative to each other, further comprising:
   first mounting means for moutning said first end support mechanism to said first body; and
   second mounting means for mounting said second end support mechanism to said second body.

* * * * *